United States Patent [19]

Wall et al.

[11] Patent Number: 5,048,971
[45] Date of Patent: Sep. 17, 1991

[54] MIXERS

[76] Inventors: David Wall, 9 Fox Hollow, Loggerheads, Stafford, Staffordshire; Thomas Hall, 12 Sark Close, Westland, Newcastle-under-Lyme, Staffordshire, both of England

[21] Appl. No.: 311,091

[22] Filed: Feb. 15, 1989

[30] Foreign Application Priority Data

Feb. 24, 1988 [GB] United Kingdom ................ 8804313

[51] Int. Cl.⁵ .............................................. B01F 7/04
[52] U.S. Cl. ..................................... 366/85; 366/301; 366/310; 366/312; 366/67
[58] Field of Search .................... 366/85, 90, 89, 295, 366/296, 298, 299, 301, 310, 312, 313, 315, 316, 323, 67, 309; 416/234

[56] References Cited

U.S. PATENT DOCUMENTS

| | | | |
|---|---|---|---|
| 2,559,418 | 7/1951 | Ford | 366/301 X |
| 2,611,590 | 9/1952 | Jebens | 366/301 X |
| 3,146,493 | 9/1964 | Steinle et al. | 366/82 X |
| 3,216,706 | 11/1965 | Loomans | 366/85 |
| 3,565,403 | 2/1971 | Matsuoka | 366/323 X |
| 4,429,626 | 2/1984 | Ihara et al. | 366/323 X |
| 4,686,088 | 8/1987 | Fritsch | 366/85 X |

Primary Examiner—Frankie L. Stinson
Attorney, Agent, or Firm—Plante, Strass, Vanderburgh & Connors

[57] ABSTRACT

With reference to FIG. 1, a continuous mixer 1 comprises a housing 2 formed with intersecting cylindrical chambers 3 and 4, and a pair of substantially parallel shafts 5 and 6, mounted for rotation within the housing. Paddle members 10 and 11 are mounted on the shafts 5 and 6 so that when the shafts are rotated, each in the same direction, the peripheral parts of the paddle members on one shaft are wiped by the cooperating parts of the paddle members on the other shaft, and vice versa. As shown in FIGS. 4a and 4b, the end faces of each paddle member are formed with lobes, the number of lobes at one end face of the member being different to that at the opposite end face. The arrangement results in continuous distribution, re-orientation and dispersal of material flowing through the mixer.

9 Claims, 5 Drawing Sheets

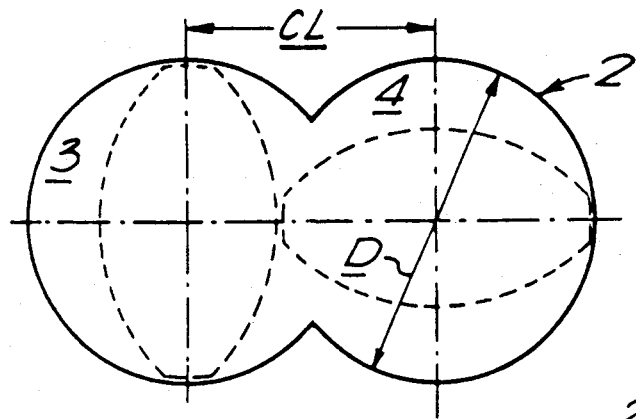
FIG. 2.
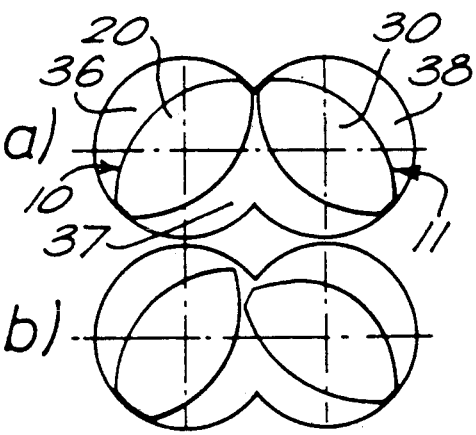
FIG. 3 a)
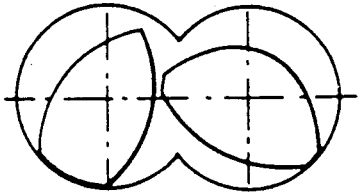
FIG. 3 b)
FIG. 3 c)
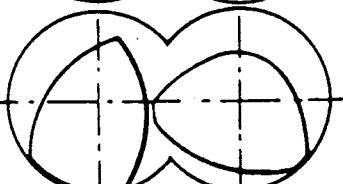
FIG. 3 d)
FIG. 3 e)
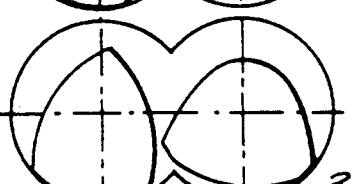
FIG. 3 f)
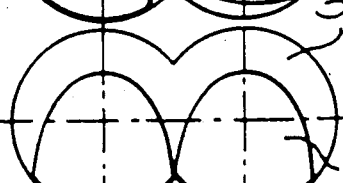

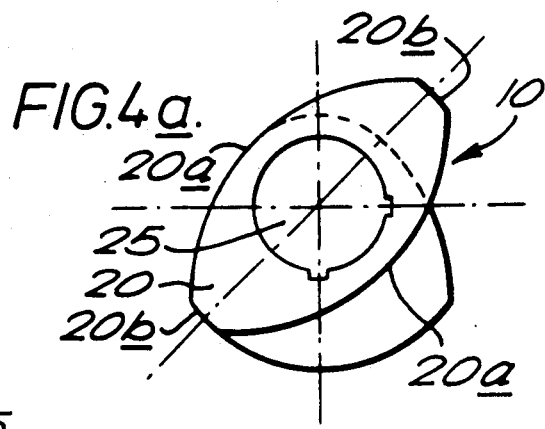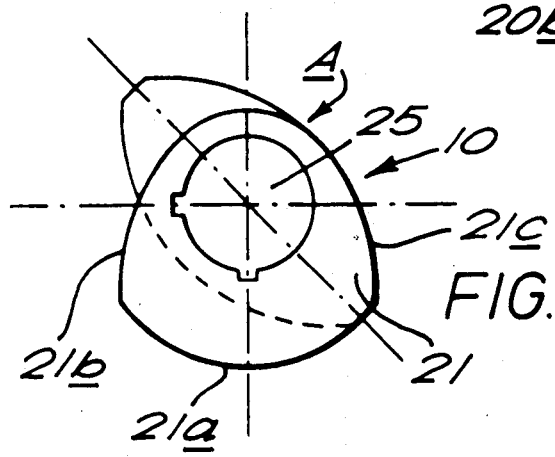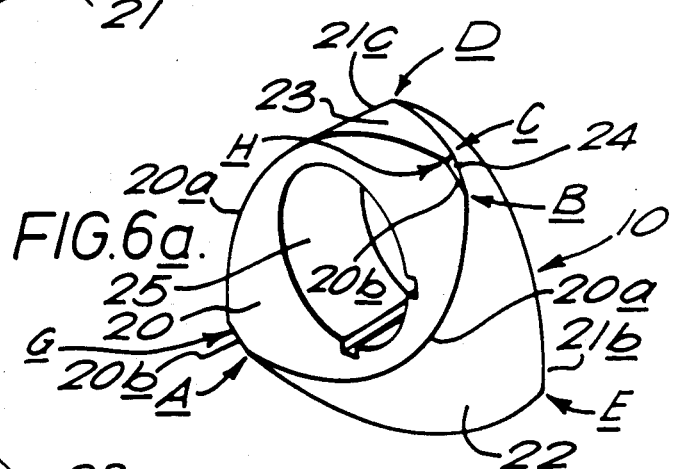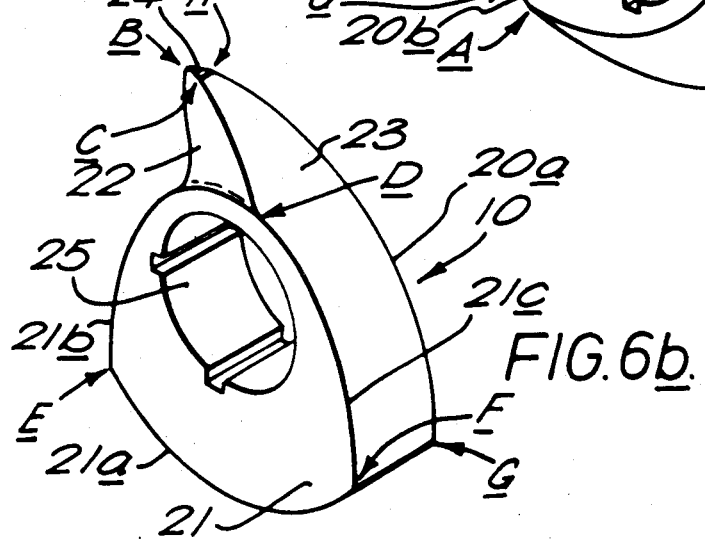

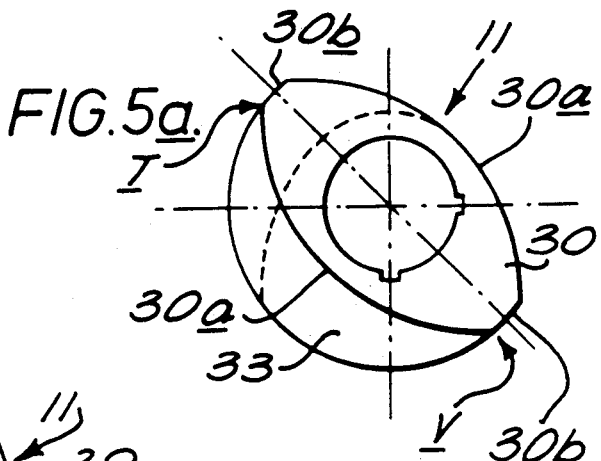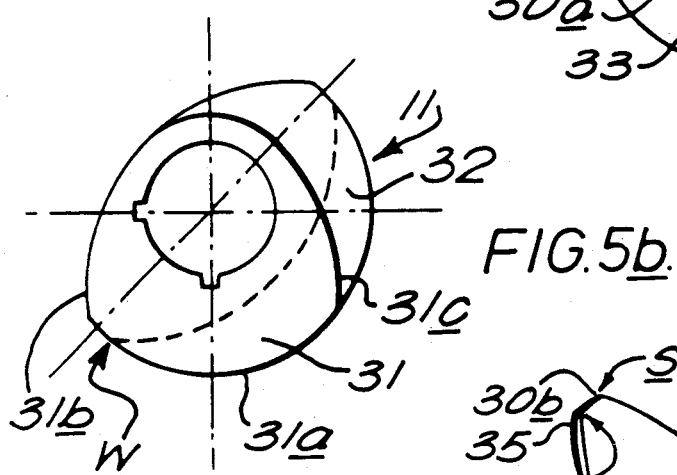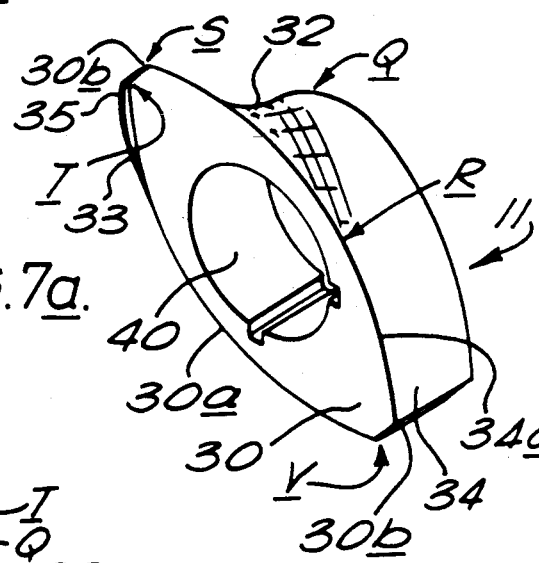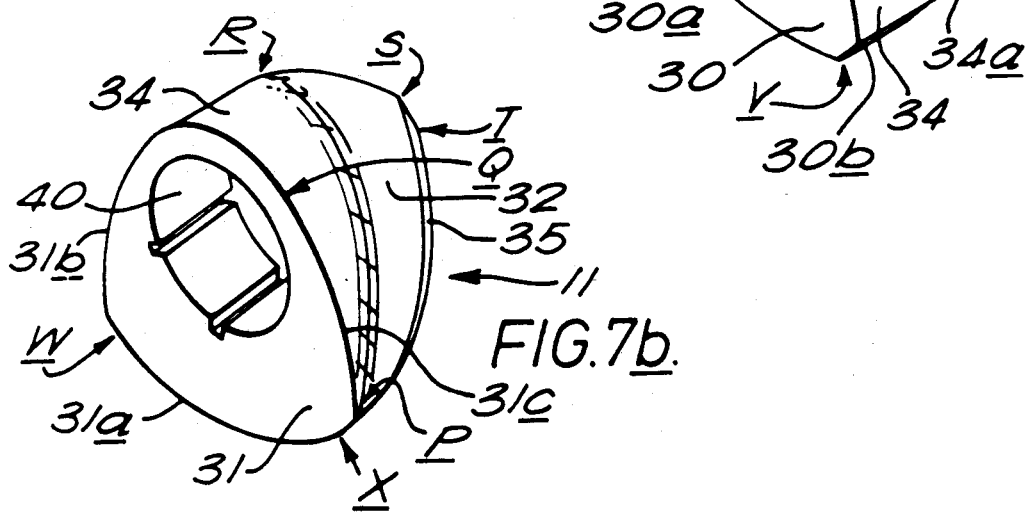

MIXERS

BACKGROUND TO THE INVENTION

This invention relates to mixers and is concerned with mixers for mixing and/or kneading materials which may be in plastic, liquid, granular or powdered form.

The invention more particularly relates to mixers of the type comprising a housing, a pair of substantially parallel shafts mounted for rotation within the housing, and a plurality of interengaging mixing and conveying paddle members mounted on each shaft, the paddle members being formed and arranged so that when the shafts are rotated each in the same direction, parts of the paddle members on one shaft are wiped by cooperating parts of the paddle members on the other shaft, and vice versa.

Such a mixer is referred to herein as "of the type described", an example of which is disclosed by British Patent No. 1,110,881 (Baker Perkins Chemical Machinery Limited).

SUMMARY OF THE INVENTION

According to the invention, a mixer of the type described is provided with interengaging mixing and conveying paddle members with lobed end faces, the number of lobes at one end face of the member being different to that at the other end face thereof.

Each member has a curved peripheral surface whereby the number of lobes at one end face is reduced to a lesser number at the other end face thereof. The contoured shapes of the cooperating pair of paddle members are arranged such that those on one shaft are in wiping contact with those on the other during rotation.

Each lobe on a paddle member is analogous to a start of a thread on a screw, thus a member having two lobes on one end face and one on the other, can be considered as a length of screw which changes progressively from a two-start type of screw at one end face, to a one-start type of screw at the other end face thereof.

Likewise other numbers of lobes or screw thread starts can be provided at one end face of a paddle member changing progressively to a different number of lobes or screw thread starts at the other end face thereof.

Shafts carrying a plurality of paddle members so defined give improved dispersive and distributive mixing to the material handled by the mixer.

The invention also comprises a paddle member per se.

BRIEF DESCRIPTION OF THE DRAWINGS

An embodiment of the invention will now be described by way of example only, with reference to the accompanying drawings, wherein:

Fig. 2 illustrates parameters of the mixer housing, FIGS. 3a-f illustrate cross-sectional profiles of cooperating paddle members at six evenly spaced planes viewed in the same static position along the longitudinal axes of the shafts carrying the said paddle members, FIGS. 4a and 4b are end views of one of a cooperating pair of paddle members, FIGS. 5a and 5b are end views of the other of a cooperating pair of paddle members, FIGS. 6a and 6b are isometric views of the paddle member of FIGS. 4a and 4b, and FIGS. 7a and 7b are isometric views of the paddle member of FIGS. 5a and 5b.

DETAILED DESCRIPTION OF THE PREFERRED EMBODIMENT

For full understanding of the present invention, reference should also be made to the disclosure of the above-mentioned British Patent No. 1,110,881.

Figure 1:
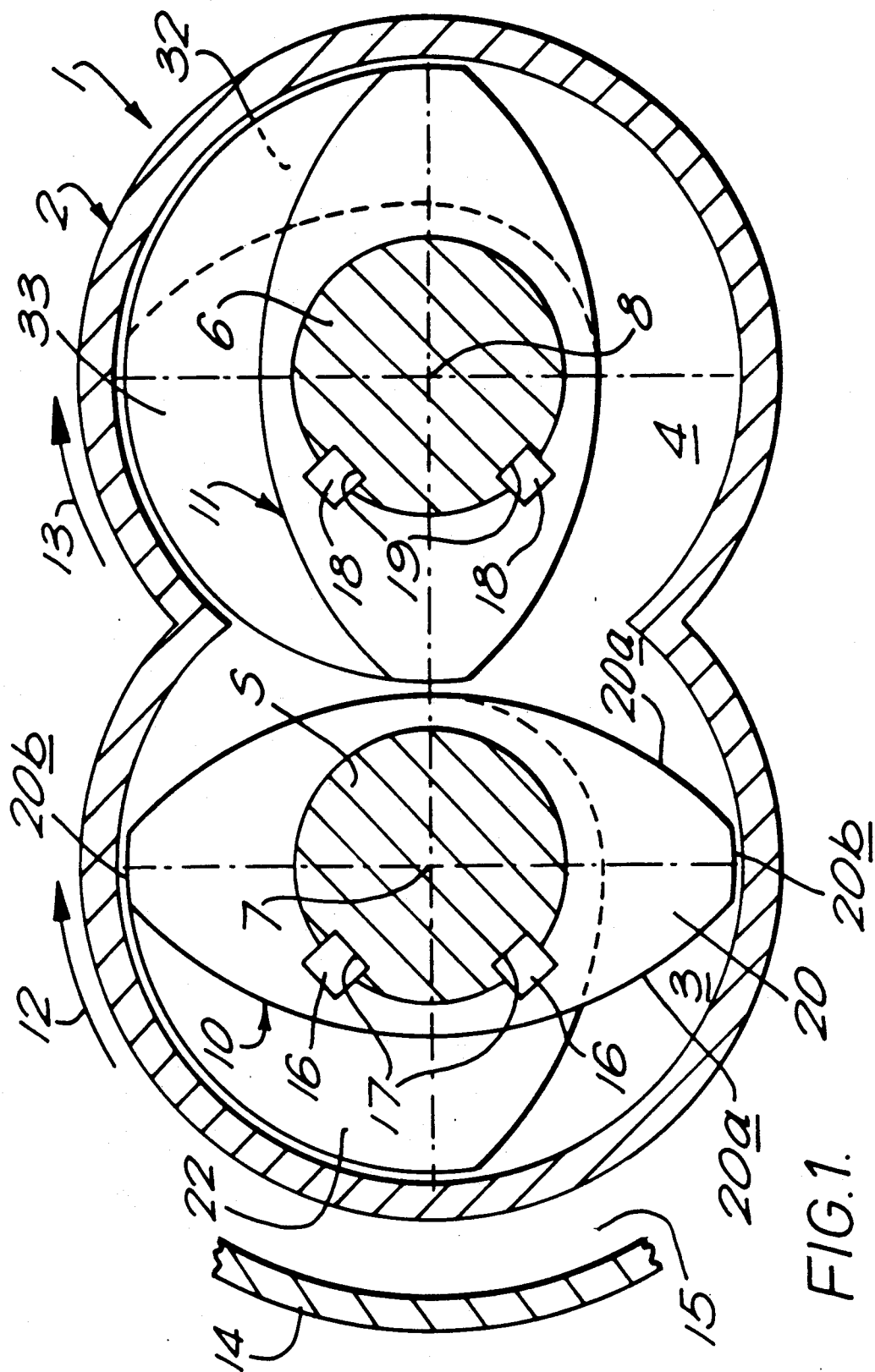
FIG. 1 illustrates both end profiles of each of a pair of cooperating paddle members.

With reference now to FIG. 1, a continuous mixer 1 comprises a housing 2 which, in the transverse section shown, is formed with left and right hand intersection cylindrical chambers 3 and 4, and a pair of substantially parallel shafts 5 and 6, mounted for rotation within the housing, about axes 7 and 8. The mixer 1 further comprises a plurality of paddle members 10 and 11 mounted on the shafts 5 and 6, so as to be driven thereby, by pairs of keys and keyways 16/17 and 18/19. The paddle members are formed and arranged so that when the shafts 5 and 6 are rotated, each in the same direction, as indicated by arrows 12 and 13, the peripheral parts of the paddle members 10 on the shaft 5 are wiped by the cooperating parts of the paddle members 11 on the other shaft 6, and vise versa.

The paddle members 10, 11 are of lobed form, the lobes being present at the opposite end faces of a paddle member.

Every point on the peripheral surface of one paddle member of a cooperating pair, when rotated, is wiped by the peripheral surface of the other and vice versa. This means that once the diameter D of the bore, the centre line ratio of the mixer (defining the centre line ratio Pc as Pc=2CL/D, where CL is the distance between the centres of rotation of the elements—see FIG. 2) and the number of lobes at the front and rear end faces of each paddle member are set, the cross-sectional shape, which varies from the front end face to the rear end face of a paddle member, is defined. Each of the cross-sectional shapes of the front end faces of a cooperating pair of paddle members which co-rotate in the manner previously described will be the same as each other, and the cross-sectional shapes of the rear end faces of the aforesaid cooperating pair of paddle members which co-rotate will be the same as each other, although both different from the shapes of their respective front end faces. In order that one paddle member will completely wipe the peripheral surface of the other of a cooperating pair, the two paddle members of the pair have different but complementary cross-section geometry during the transition of the cross-sectional shapes of each paddle member from its shape at the front end face to its shape at its respective rear end face. The complete transition (in 5 stages) of two paddle members from a two-lobe profile on each as shown at reference a) of FIG. 3, transposing to a one lobe profile on each at reference f) via references b), c), d), and e), is shown in FIG. 3.

A row of contiguous paddle members 10 is mounted on the shaft 5 and a row of contiguous paddle members 11 is mounted on the shaft 6. Each pair of intermeshing paddle members consists of one each of paddle members 10 and 11. Each may be on either shaft, and each shaft may carry both forms. The preferred disposition of the contiguous members on a shaft is such that the peripheral surface of one member smoothly blends into the peripheral surface of the adjacent paddle member on the same shaft.

The housing 2 is enclosed by a wall 14 which, with the housing, defines a jacket 15 to hold a heating or cooling medium.

With reference to FIGS. 4a and 6a, the paddle member 10 has a front or obverse end face 20 of lenticular two-lobed profile with two flanks 20a between two crests 20b, the two crests comprise the two lobes of the front end face, the said lobes wipe the inner face of chamber 3 of housing 2 during rotation of paddle member 10. As illustrated in FIGS. 4b and 6b, member 10 has a rear or reverse end face 21 of generally triangular, single-lobed profile with curved sides 21a, 21b and 21c. Side 21a comprises the single lobe wiping crest of rear end face 21.

As illustrated in FIGS. 6a and 6b, the peripheral surface of paddle member 10 formed between front end face 20 and rear end face 21 consists of three areas, namely 22, 23 and 24.

Area 22 as illustrated in FIG. 6a, comprises a helical groove or flute contained within a line from point A to point B on the front end face 20 then via point C across to the rear end face 21 at point D and thence to point E, and finally back to point A on the front end face 20 of the paddle member 10.

Area 23 as illustrated in FIGS. 6a and 6b, comprises the convex peripheral portions which wipe the inner chamber 3. The said peripheral portions are defined as the area lying within a line from point A on the front end face 20 across to point E on the rear end face 21, through points F and D, via point C across to point H on the front end face 20, then via the flank 20a to point G and then finally, via the lower crest 20b back to point A.

Area 24 comprises the upper crest 20b defined by points C, B and H, as illustrated in FIG. 6a.

The paddle members 10 and 11 are located respectively on the shafts 5 and 6 by holes 25 and 40 to be driven thereby, by means of the keys and keyways 16/17 and 18/19. FIGS. 5a and 5b together with FIGS. 7a and 7b, illustrate a paddle member 11 which has a front or obverse end face 30 and a rear or reverse end face 31 identical to the front end face 20 and the rear end face 21 respectively of paddle member 10 as shown in FIGS. 4a and 4b and FIGS. 6a and 6b.

Thus as shown in FIGS. 5a and 7a, the paddle member 11 has a front or obverse end face 30 of lenticular two-lobed profile with two flanks 30a extending between two crests 30b, which crests wipe the inner face of chamber 4 during rotation of paddle member 11. As illustrated in FIGS. 5b and 7b, member 11 has a rear or obverse end face 31 of generally triangular, single-lobed profile with curved sides 31a, 31b and 31c. Side 31a comprises the single lobe wiping crest of rear end face 31.

As illustrated in FIGS. 7a and 7b, the peripheral surface of paddle member 11 formed between front end face 30 and rear end face 31 consists of four areas, namely 32, 33, 34 and 35.

Area 32 as illustrated in FIG. 7b, comprises a helical groove or flute contained within a line from point P on rear end face 31 to point Q on rear end face 31, then across to point R on front end face 30 and via point S on front end face 30, back to point P on rear end face 31.

Area 33 as illustrated in FIGS. 5a and 5b and FIGS. 7a and 7b, comprises a helical surface which is contained within a line from point T on front end face 30, through point V on front face 30, then axially across to point W and on to point X on rear end face 31, and finally back across to point T on front end face 30.

Area 34 as illustrated in FIGS. 7a and 7b, comprises a convex peripheral portion contained within a line passing from point Q on rear end face 31, along the rear end face to point W on the lower crest 30b, then axially across to point V on front end face 30, then from point V back along lower crest 30b and along the front end face to point R, and finally back across to point Q on rear end face 31.

Area 35 as illustrated in FIGS. 7a and 7b, comprises a narrow peripheral portion which connects uppper lobe crest 30b on front end face 30 with single lobe crest 31a on rear end face 31. The said narrow peripheral portion wipes the inner face of chamber 4 during rotation of paddle member 11. The area 35 is contained within a line from point S along the upper crest 30b to point T on front end face 30, and thence to point X on the rear end face 31. From point X the line continues along part of crest 31a to point P, and then back across to point S on the front end face 30.

Referring to FIG. 3, reference (a) shows the lenticular two-lobed profiles of the front end face 20 of the paddle member 10 and the front end face 30 of the paddle member 11, whilst reference (f) shows the appropriate generally triangular single-lobed profiles of the rear end face 21 of member 10 and the rear end face 31 of member 11. References (b) to (e) show cross-sectional views of the paddle members 10 and 11 at evenly spaced planes along the longitudinal axes of the shafts 5 and 6.

With paddle members 10 and 11 in the attitude illustrated at reference (a), three channels 36, 37 and 38 are available for the passage of materials whereas as the materials flow longitudinally along the cylindrical chambers 3 and 4 from (a) to (f), the passageway is changed from that defined by the three channels 36, 37 and 38 to that defined by the single combined channel 39.

Looking at the transition as shown in FIG. 3 from (a) to (f) it can be seen that channels 36 and 38 combine and channel 37 reduces to substantially zero.

In the combining of channels 36 and 38, previously separated materials are mixed together. The material that is in channel 37, the volume of which is reduced substantially to zero, undergoes compression. As the material is displaced from channel 37, it is forced to flow by a circuitous route into the one available channel 39. In this process high local pressures are generated.

Figure 8:
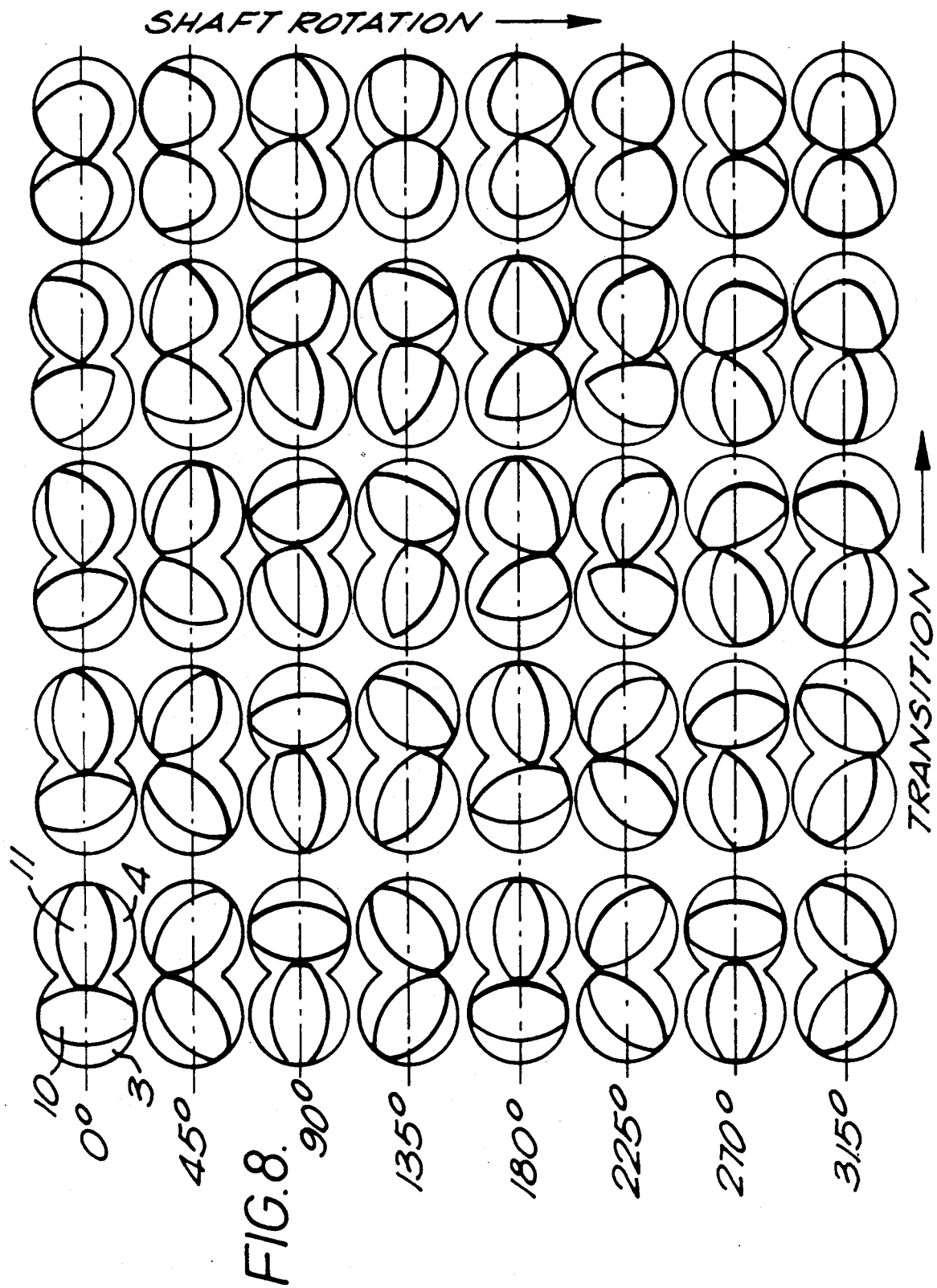
FIG. 8 illustrates the attitudes of the cross-sectional profiles viewed axially of a cooperating pair of paddle members during rotation of the shafts carrying the paddle members.

FIG. 8 illustrates the relative attitudes of intermeshing cross-sectional profiles of a pair of paddle members 10 and 11 due to (i) the effect of transition in four equal stages shown in five columns from two lobes in each paddle member to a single lobe in each paddle member reading from left to right, and (ii) the effect of rotation of the shafts in 45 degrees steps shown in eight lines reading from top to bottom.

Referring to any line across which illustrates the transition of the pair of cross-sections of a pair of paddle members along their length at an instantaneous shaft position, the changing shape and number of channels available for the material being mixed can be seen. This effect is due to the transitional change of number of lobes on the paddle members. From this can be deduced the type of mixing forces and effects applied to the material flowing along the chambers 3 and 4.

Referring to any column, which represents a particular pair of cross-sectional profiles, there is shown from top to bottom, successive intermeshing attitudes of paddle members for each 45 degrees of rotation of the shafts. In any particular column there is shown the changing chape and number of channels available for the material. From this can be deduced the type of mixing forces and effects applied to the material due to the rotation of the shafts.

The transition from two lobes to one lobe is illustrated by the cross-sectional profiles in five equal steps in FIG. 3 and in four equal steps at the 225 degree line in FIG. 8.

During this process of transfer to the single combined channel 39, the material passes through small gaps and experiences considerable extension as well as shear flow as a result of this transfer. Such forces generated in the material will be exerted on particulated agglomerates that may exist within the main matrix. If these forces are sufficient, the agglomerates will be broken down, thus affecting their dispersion. Such actions as intense elongational and shear flow, increase the contact area between heterogeneous phases in the mix, helping it to become homogeneous on the micro scale. Using another pair of members 10 and 11 mounted such that each single lobe face is against and aligned with another single lobe face, the material as it continues to flow longitudinally through the chambers 3 and 4, is again divided into different separate channels, and this will effect some distributive mixing. The paddle members 10 and 11 are thus used in series continually to distribute, re-orientate and disperse the flow of material through the mixer.

The self-wiping action of the paddle members avoids the creation of dead regions in the mixing zones. This is important when dealing with materials that are susceptible to degradation under the processing conditions, as are many plastics materials. If they remain in the mixing zone for an excessive period of time they will begin to lose some of their physical properties.

Although reference has only been made to a pair of transitional paddle members each of which has a form which changes from two-lobe at one end face to a single lobe at the other end face, the same principle may be applied to any transitional paddle member which employs any one of plurality of lobe change combinations, provided only that the design allows a wiping contact between two opposing paddle members to be maintained.

When assembling the paddle members on the twin shafts to give a plurality of paddle members on each shaft, each pair of the said paddle members are arranged on the two shafts as two complementary intermeshing members. For example, one each of the paddle members 10 and 11 on each of the shafts and intermeshing with each other. Thus in one arrangement one shaft can carry a set of paddle members 10 only. In an alternative arrangement one shaft can carry a plurality of members 10 and 11. The contiguous paddle members can be, and preferably are, arranged such that they have smooth profile changes by aligning the lobes, and by matching the number of lobes on contiguous faces.

The principle of operation is independant of the distance over which transition takes place, but the intensity of mixing action depends on the rate of change of channel volumes which in turn is a function of both the length of transition and the speed of rotation of the shafts.

The paddle members 10 and 11 have a helical spiral which helps to convey material and results in a low net pressure drop along the axial length of the members compared to other known designs of mixing elements.

We claim:

1. A mixer comprising a housing, a pair of substantially parallel shafts mounted for rotation within the housing, and a plurality of interengaging mixing and conveying paddle members mounted on each shaft, the paddle members being formed and arranged so that when the shafts are rotated each in the same direction, parts of the paddle members on one shaft are wiped by cooperating parts of the paddle members on the other shaft, and vice versa, the interengaging mixing and conveying paddle members having lobed end faces, the number of lobes at one end face of a member being different to that at the other end face thereof.

2. A mixer as claimed in claim 1, wherein each paddle member has a curved peripheral surface whereby the number of lobes at one end face is reduced to a lesser number at the other end face thereof.

3. A mixer as claimed in claim 2, wherein curved peripheral surfaces of the cooperating pair of paddle members are arranged such that those on one shaft are in wiping contact with those on the other shaft during rotation.

4. A mixer as claimed in claim 1, wherein the obverse end face of a paddle member has a lenticular two-lobed profile and the reverse end face of the paddle member has a generally triangular, single-lobed profile.

5. A mixer as claimed in claim 4, wherein the said paddle member has a curved peripheral surface of helical form extending between the end faces of the paddle member.

6. A mixer as claimed in claim 1 wherein said housing has a mixing chamber with and inner wall contoured in the shape of parallel cylinders, one each coaxial with a respective one of said shafts, and intersecting along common chordal planes, and wherein said paddle members also wipe said inner wall of said mixing chamber.

7. A mixer as claimed in claim 6 having a pair of said shafts and paddle mixers and wherein said inner wall of said mixing chamber is contoured in the shape of a pair of parallel, intersecting cylinders.

8. A mixer as claimed in claim 9 wherein said paddles are aligned, end-to-end, with adjacent front faces and adjacent rear faces.

9. A paddle member for use with a mixer, the paddle member having lobed end faces, the number of lobes at one end face being lesser than that at the other end face thereof, and wherein the obverse end face of said paddle member has a lenticular two-lobed profile and the reverse end face of the paddle member has a generally triangular, single-lobed profile.

* * * * *

UNITED STATES PATENT AND TRADEMARK OFFICE
CERTIFICATE OF CORRECTION

PATENT NO. : 5,048,971

DATED : 17 September 1991

INVENTOR(S) : David Wall and Thomas Hall

It is certified that error appears in the above-identified patent and that said Letters Patent is hereby corrected as shown below:

On the title page, Item [73], should read
APV PLC,

London, England

Signed and Sealed this

Ninth Day of March, 1993

*Attest:*

STEPHEN G. KUNIN

*Attesting Officer*   Acting Commissioner of Patents and Trademarks